(12) United States Patent
Hampton

(10) Patent No.: US 9,809,315 B2
(45) Date of Patent: Nov. 7, 2017

(54) APOGEE ENHANCING EJECTION SEAT STABILIZATION DROGUE CHUTE

(71) Applicant: AMI Industries, Inc., Colorado Springs, CO (US)

(72) Inventor: John Hampton, Colorado Springs, CO (US)

(73) Assignee: AMI INDUSTRIES, INC., Colorado Springs, CO (US)

( * ) Notice: Subject to any disclaimer, the term of this patent is extended or adjusted under 35 U.S.C. 154(b) by 223 days.

(21) Appl. No.: 14/675,232

(22) Filed: Mar. 31, 2015

(65) Prior Publication Data

US 2016/0288914 A1 Oct. 6, 2016

(51) Int. Cl.
*B64D 25/08* (2006.01)
*B64D 17/12* (2006.01)
*B64D 25/10* (2006.01)
*B64D 17/24* (2006.01)

(52) U.S. Cl.
CPC ............. *B64D 17/12* (2013.01); *B64D 17/24* (2013.01); *B64D 25/10* (2013.01)

(58) Field of Classification Search
CPC ........ B64D 17/12; B64D 17/24; B64D 25/10; B64D 17/62; B64D 17/30; B64D 17/00; B64D 2700/62517; B64D 17/72; B64D 2700/62578; B64D 11/0689; B64D 17/06; B64D 17/66

See application file for complete search history.

(56) References Cited

U.S. PATENT DOCUMENTS

| 2,823,881 | A | * | 2/1958 | Patterson | B64D 17/00 244/113 |
| 2,970,795 | A | * | 2/1961 | Gold | B64D 17/00 244/142 |
| 3,493,199 | A | * | 2/1970 | Flatau | B64D 17/00 244/145 |
| 3,602,462 | A | * | 8/1971 | Slater | B64D 17/00 244/145 |
| 3,861,625 | A | * | 1/1975 | Sadler | B64D 25/10 244/122 AB |

(Continued)

FOREIGN PATENT DOCUMENTS

| EP | 0195609 | 9/1986 |
| EP | 0861782 | 9/1998 |

(Continued)

OTHER PUBLICATIONS

Extended European Search Report dated Aug. 8, 2016 in European Application No. 16163339.1.

*Primary Examiner* — Medhat Badawi
(74) *Attorney, Agent, or Firm* — Snell & Wilmer, L.L.P.

(57) ABSTRACT

An aircraft ejection system is provided. The aircraft ejection system may comprise a seat, a bridle coupled to the seat, suspension lines coupled to the bridle, and a drogue canopy coupled to the suspension lines. A first side of the drogue canopy may have a lower drag than a second side of the drogue canopy. The first side may comprise a mesh portion and/or an opening to reduce drag. The first side may further include a low-resistance structure with a circular or rectangular geometry. The bridle and the suspension lines may be configured to direct the first side in a predetermined direction, such as downward.

11 Claims, 5 Drawing Sheets

(56) References Cited

U.S. PATENT DOCUMENTS

| | | | | |
|---|---|---|---|---|
| 3,927,850 | A * | 12/1975 | Rychnovsky | B64D 17/12 244/145 |
| 4,117,993 | A * | 10/1978 | Palm | B64D 17/12 244/145 |
| 4,613,101 | A * | 9/1986 | Herndon | B64D 25/10 244/122 A |
| 4,699,338 | A * | 10/1987 | Penberthy | B64D 17/14 244/142 |
| 4,927,099 | A * | 5/1990 | Emerson | B64D 39/00 244/110 R |
| 5,104,066 | A * | 4/1992 | Aronne | B64D 25/10 244/122 AE |
| 5,388,787 | A * | 2/1995 | Webb | B64D 17/62 244/142 |
| 6,199,800 | B1 * | 3/2001 | Coe | B64D 17/66 244/142 |
| 6,299,103 | B1 * | 10/2001 | Shope | B64D 11/0689 244/122 A |
| 6,669,146 | B2 * | 12/2003 | Lee | B64D 17/06 244/142 |
| 2013/0200218 | A1 * | 8/2013 | Suh | B64D 17/72 244/146 |
| 2015/0054323 | A1 * | 2/2015 | Mastrolia | B64D 25/10 297/313 |

FOREIGN PATENT DOCUMENTS

| | | |
|---|---|---|
| FR | 837041 | 2/1939 |
| GB | 723922 | 2/1955 |
| GB | 2339410 | 1/2000 |

* cited by examiner

APOGEE ENHANCING EJECTION SEAT STABILIZATION DROGUE CHUTE

FIELD OF INVENTION

The present disclosure relates to parachutes, and, more specifically, to a drogue parachute having selectively reduced surface resistance.

BACKGROUND

During ejection events, an ejection seat may be propelled from a cockpit. A parachute system may then be employed to reduce the air velocity of the ejection seat and deliver the seat safely to land or sea. Drogue parachutes may deploy rapidly in response to the seat ejecting from the cockpit. The drogue parachute may decelerate and stabilize the ejection seat to enable safe deployment of a main parachute. In some instances, with heavier aircrew, for example, the clearance between an ejecting seat and the passing tail of an aircraft may be minimal. A drogue parachute pulling the seat aft, towards the tail of the aircraft, may cause a collision between the drogue chute and the tail of the aircraft or the ejecting seat and the tail of the aircraft.

SUMMARY

A drogue parachute may comprise a bridle, suspension lines coupled to the bridle, and a canopy coupled to the suspension lines. The canopy may comprise a first side with a lower air resistance than a second side opposite the first side.

In various embodiments, the first side comprises a mesh portion configured to reduce drag. The first side may also comprise an opening configured to reduce drag. The first side may further comprise a low resistance portion in a circular or rectangular configuration. The bridle and the suspension lines may be configured to direct the first side in a predetermined direction, such as downward. The low-resistance structure may comprise an area ranging from 10 to 400 square inches.

An aircraft ejection system may comprise a seat, a bridle coupled to the seat, suspension lines coupled to the bridle, and a drogue canopy coupled to the suspension lines. A first side of the drogue canopy may have a lower drag than a second side of the drogue canopy.

In various embodiments, the first side may comprise a mesh portion configured to reduce drag on the first side. The first side may also comprise an opening configured to reduce drag on the first side. The first side may further comprise a low-resistance structure in a circular or rectangular configuration. The bridle and the suspension lines may be configured to direct the first side of the drogue canopy in a predetermined direction. The predetermined direction may be downward. The low-resistance structure may comprise an area ranging from 10 to 400 square inches. The low resistance structure may comprise a mesh material.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the figures, wherein like numerals denote like elements.

DETAILED DESCRIPTION

The detailed description of exemplary embodiments herein makes reference to the accompanying drawings, which show exemplary embodiments by way of illustration. While these exemplary embodiments are described in sufficient detail to enable those skilled in the art to practice the exemplary embodiments of the disclosure, it should be understood that other embodiments may be realized and that logical changes and adaptations in design and construction may be made in accordance with this disclosure and the teachings herein. Thus, the detailed description herein is presented for purposes of illustration only and not limitation. The steps recited in any of the method or process descriptions may be executed in any order and are not necessarily limited to the order presented.

Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact. Surface shading suspension lines may be used throughout the figures to denote different parts but not necessarily to denote the same or different materials.

As used herein, "aft" refers to the direction associated with the tail (e.g., the back end) of an aircraft, or generally, to the direction of exhaust of the gas turbine. As used herein, "forward" refers to the direction associated with the nose (e.g., the front end) of an aircraft, or generally, to the direction of flight or motion.

Figure 1:
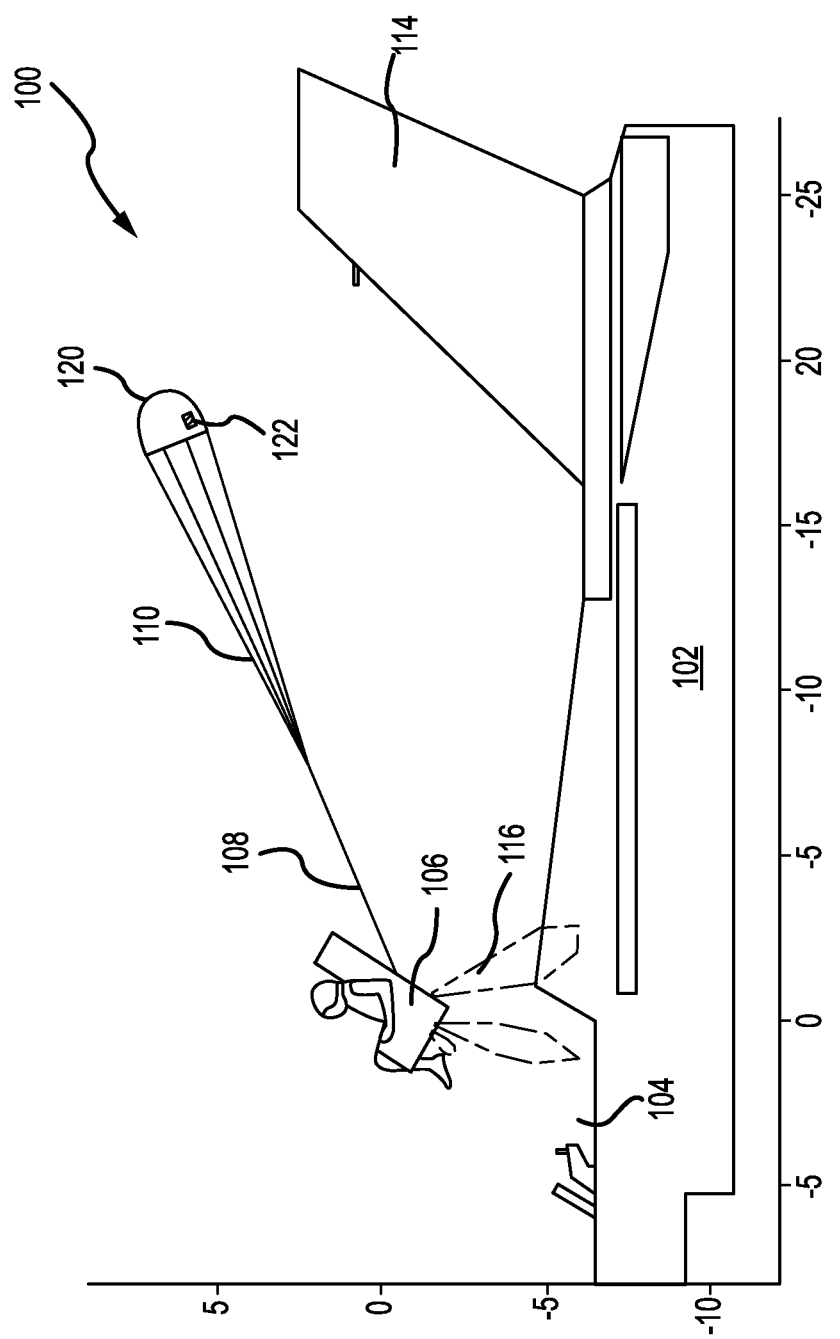
FIG. 1 illustrates a drogue parachute pulling in a partially upward direction above a tail of an aircraft, in accordance with various embodiments.

With reference to FIG. 1, an aircraft ejection system 100 is shown, in accordance with various embodiments. A scale is illustrated along the boundaries of FIG. 1 to show distances in feet. Aircraft ejection system 100 may be installed in aircraft 102 to safely eject seat 106 from cockpit 104. Seat 106 may be urged from cockpit 104 by propulsion system 116. Bridles 108 may be coupled to suspension lines 110. Suspension lines 110 may also be coupled around a circular perimeter of drogue canopy 120 (also referred to herein as a drogue parachute) having a hemispherical geometry or other suitable geometry. Drogue canopy 120 may include a low-resistance structure 122 facing in the direction of the aircraft or, generally, downward.

Figure 2:
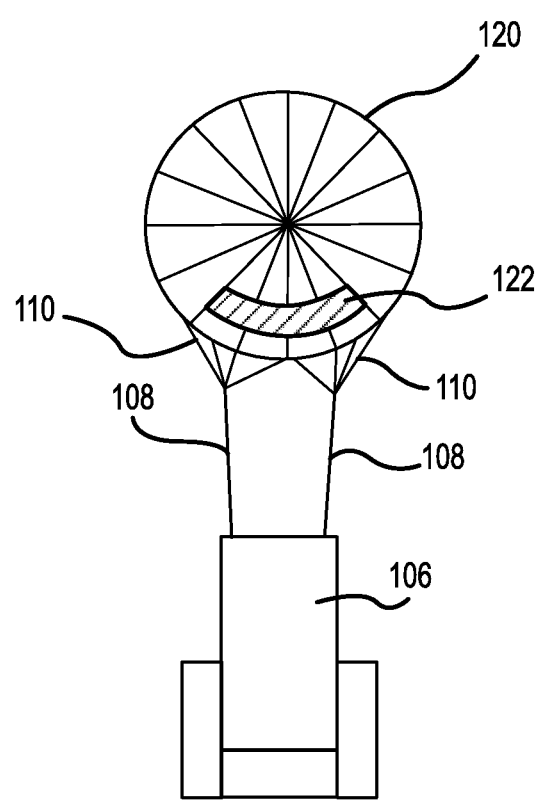
FIG. 2 illustrates an ejection seat with a deployed drogue parachute as viewed from forward looking aft, in accordance with various embodiments.

With reference to FIG. 2, drogue canopy 120 is shown with low-resistance structure 122 directed downward. Seat 106 has two bridles coupled to seat 106 at a distance from one another to prevent the bridles from twisting about one another. An end of the bridles opposite the seat is coupled to suspension lines 110 at points about the circular perimeter of drogue canopy 120 (for clarity, suspension lines 110 are not shown in FIG. 2 where the suspension lines would obstruct the view of drogue canopy 120). Bridles 108 and suspension lines 110 are configured so that drogue canopy 120 self-orients with low-resistance structure 122 facing a predetermined direction on deployment. In that regard, bridles 108 and suspension lines 110 may be configured to direct the side of drogue canopy 120 having the lowest resistance in a downward direction towards seat 106, for example.

In various embodiments and with reference to FIGS. 1 and 2, air pressure may build in the drogue canopy 120 in response to an ejection. As air pressure builds in drogue canopy 120, the pressure may press against the wall of drogue canopy 120. Low-resistance structure 122 may provide less surface area for air pressure to interact with and press against. In that regard, low-resistance structure 122 may allow more air to pass through than other portions of drogue canopy 120. Thus, drogue canopy may tend to move and/or provide drive in the direction opposite the low-resistance structure 122 (i.e., towards the side without a low-resistance structure). Low-resistance structure 122 may be a mesh or low-wind-resistance textile having a lower skin drag and/or higher gas permeability than other portions of drogue canopy 120. Low-resistance structure 122 may also be formed as an opening or vent defined by drogue canopy 120 with no material present in the opening to provide wind resistance. Low-resistance structure 122 may have an area from 10 to 400 square inches (64-2580 square centimeters). Low-resistance structure 122 may also be formed near the circular perimeter of drogue canopy 120 so that the area of low-resistance structure 122 when viewed from forward to aft is less than the actual area of low-resistance structure 122.

Figure 3:
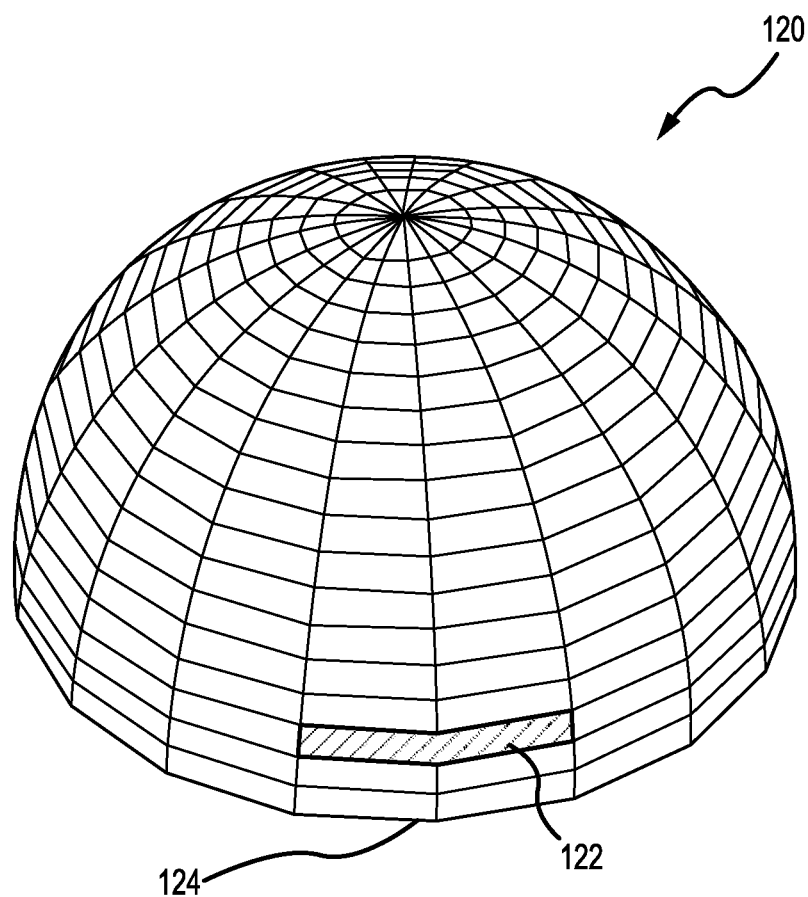
FIG. 3 illustrates a drogue canopy having a rectangular low-resistance structure on one side, in accordance with various embodiments.

With reference to FIG. 3, low-resistance side 124 of drogue canopy 120 is shown, in accordance with various embodiments. Low-resistance side 124 of drogue canopy 120 comprises low-resistance structure 122 with a rectangular geometry. Low-resistance structure 122 may be an opening formed in drogue canopy 120 or a low-resistance material such as a mesh or other readily gas-permeable material that allows air to pass through more readily than the main material of drogue canopy 120. Low-resistance side 124 of drogue canopy 120 may have a lower drag coefficient than the side of drogue canopy 120 oriented 180° opposite low-resistance side 124.

In that regard, air in drogue canopy 120 may have less surface on low-resistance side 124 to interact with and may escape drogue canopy 120 more easily than at other locations on the canopy. Similarly, low-resistance side 124 of drogue canopy 120 may also include a lower skin resistance than other locations on drogue canopy 124. Additionally, low-resistance side 124 may have a lower form resistance (i.e., resistance created by the shape of the drogue canopy) than other portions of drogue canopy 120. When deployed, drogue canopy 120 may be configured with low-resistance side 124 directed downward (i.e., towards the aircraft from which a seat is ejected, as illustrated in FIG. 1) to urge drogue canopy 124 in at least a partially upward direction (i.e., away from the aircraft from which the seat is ejected).

Figure 4:
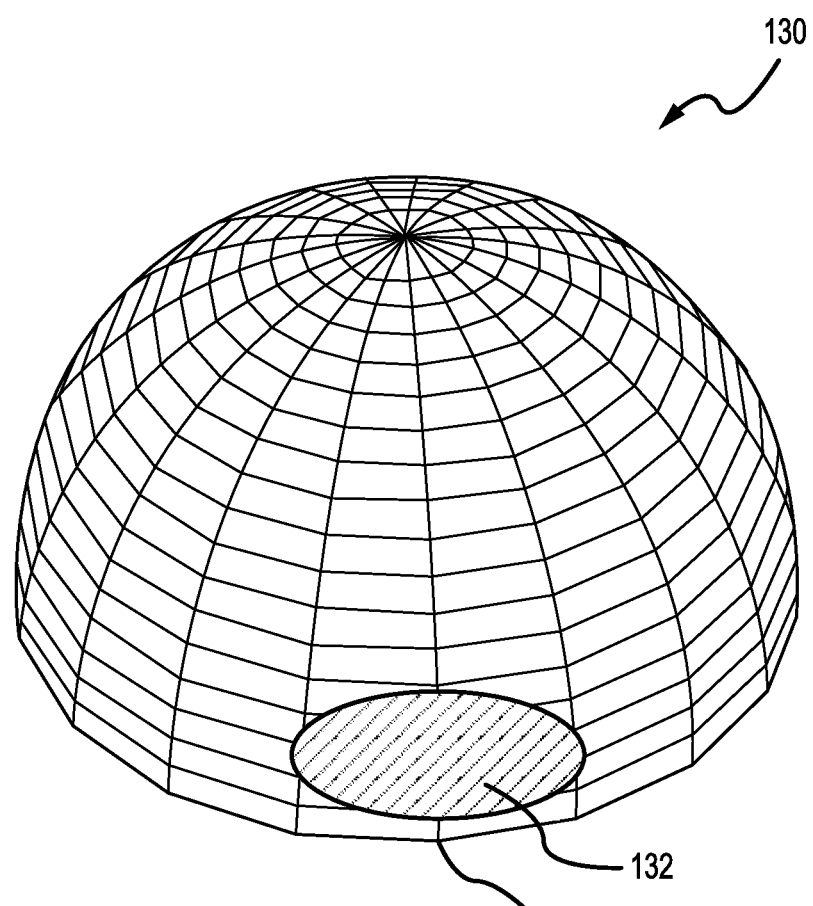
FIG. 4 illustrates a drogue canopy having a circular low-resistance structure in one side, in accordance with various embodiments.

With reference to FIG. 4, a drogue canopy 130 with low-resistance side 134 having low-resistance structure 132 is shown, in accordance with various embodiments. Low-resistance side 134 of drogue canopy 130 comprises low-resistance structure 132 with a rounded geometry. Rounded geometry may be elliptical or circular, for example. Low-resistance structure 132 may be an opening formed in drogue canopy 130 or a low-resistance material such as a mesh or other readily gas-permeable material that allows air to pass through more readily than the main material of drogue canopy 130. Low-resistance side 134 of drogue canopy 130 may have lower drag than the side of drogue canopy 130 opposite low-resistance side 134. Lower drag may stem from having low form drag because of less material on the low-resistance side 134 than on other sides of drogue canopy 130. Lower drag than other portions of drogue canopy 130 may also be achieved by using a material with lower skin drag in the low-resistance structure of the canopy. When deployed, drogue canopy 130 may be configured with low-resistance side 134 directed downward (as illustrated in FIG. 1) to urge drogue canopy 134 in at least a partially upward direction.

Figure 5:
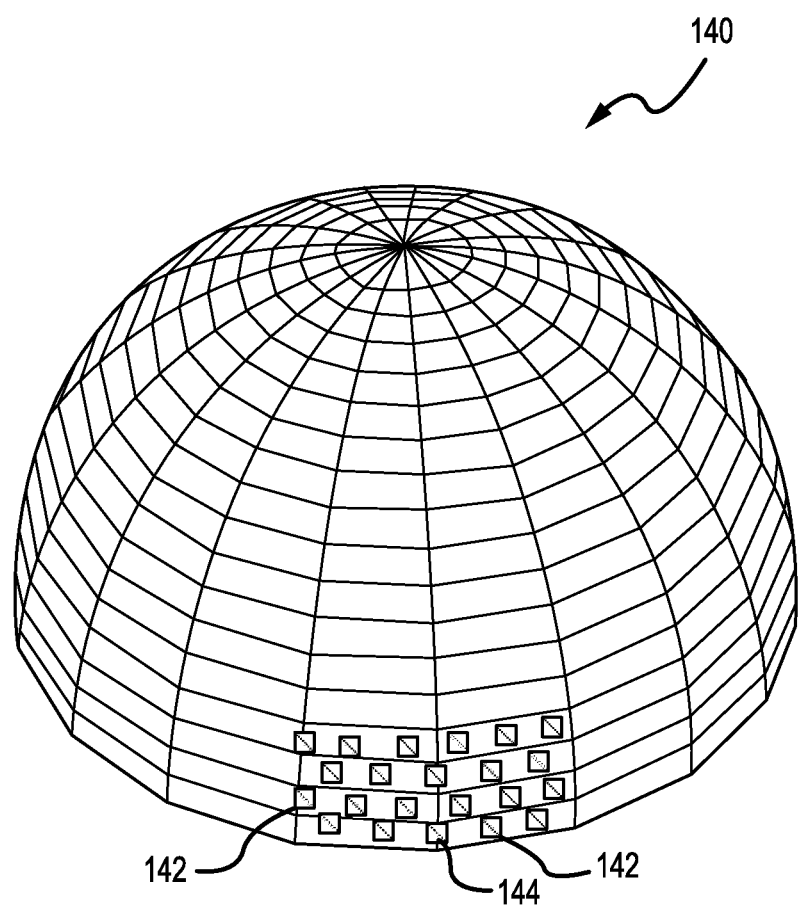
FIG. 5 illustrates a drogue canopy having multiple low-resistance structures in one side, in accordance with various embodiments.

With reference to FIG. 5, a drogue canopy 140 with low-resistance side 144 having low-resistance structures 142 are shown, in accordance with various embodiments. Low-resistance side 144 of drogue canopy 140 comprises multiple low-resistance structures 142. Low-resistance structures 142 may be rectangular, circular, elliptical, irregularly shaped, or otherwise shaped. Low-resistance structures 142 may be openings formed in drogue canopy 140 or a low-resistance material such as a mesh or other readily gas-permeable material that allows air to pass through low-resistance structures 142 more readily than the main material of drogue canopy 140. Low-resistance side 144 of drogue canopy 140 may have a lower drag than the side of drogue canopy 140 opposite low-resistance side 144. When deployed, drogue canopy 140 may be configured with low-resistance side 144 directed downward (as illustrated in FIG. 1) to urge drogue canopy 144 in at least a partially upward direction.

Benefits and other advantages have been described herein with regard to specific embodiments. Furthermore, the connecting suspension lines shown in the various figures contained herein are intended to represent exemplary functional relationships and/or physical couplings between the various elements. It should be noted that many alternative or additional functional relationships or physical connections may be present in a practical system. However, the benefits, advantages, and any elements that may cause any benefit or advantage to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods and apparatus are provided herein. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f), unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. An aircraft ejection system, comprising:
   a seat comprising a propulsion system, wherein the propulsion system urges the seat in a first direction; and
   a canopy coupled to the seat and comprising a first side having a drag coefficient lower than a second side of the canopy opposite the first side of the canopy, wherein the first side of the canopy comprises a first vent defined by the canopy and devoid of material, and wherein the first vent is oriented away from the first direction and reflects air out the canopy in a second direction different from the first direction, and wherein the orientation of the first vent drives the canopy in the first direction.

2. The aircraft ejection system of claim 1, wherein the first vent reduces the drag coefficient on the first side.

3. The aircraft ejection system of claim 1, wherein the first side of the canopy further comprises a second vent defined by the canopy and devoid of material.

4. The aircraft ejection system of claim 1, wherein the first vent comprises at least one of a circular geometry or a rectangular geometry.

5. The aircraft ejection system of claim 1, wherein the first vent comprises an area ranging from 10 to 400 square inches.

6. An aircraft ejection system, comprising:
   a seat comprising a propulsion system, wherein the propulsion system urges the seat in a first direction;
   a bridle coupled to the seat;
   a suspension line coupled to the bridle; and
   a drogue canopy coupled to the suspension line, wherein a first side of the drogue canopy comprises a plurality of vents defined by the drogue canopy and devoid of material, wherein the plurality of vents is oriented opposite the first direction and reflect air out of the drogue canopy in a second direction different from the first direction, and wherein the orientation of the plurality of vents drives the drogue canopy in the first direction.

7. The aircraft ejection system of claim 6, wherein the plurality of vents reduce a drag coefficient on the first side.

8. The aircraft ejection system of claim 6, wherein a first vent of the plurality of vents comprises at least one of a circular or rectangular geometry.

9. The aircraft ejection system of claim 6, wherein the the first side of the drogue canopy is oriented downward upon a deployment of the aircraft ejection system.

10. The aircraft ejection system of claim 6, wherein the plurality of vents comprise an area ranging from 10 to 400 square inches.

11. The aircraft ejection system of claim 6, wherein the first side of the drogue canopy faces an aircraft in response to an ejection of the seat from the aircraft and wherein the first direction comprises a direction away from the aircraft.

* * * * *